US009026827B2

(12) United States Patent
Imaizumi

(10) Patent No.: US 9,026,827 B2
(45) Date of Patent: May 5, 2015

(54) CONTROL DEVICE AND COMPUTER PROGRAM PRODUCT FOR CONTROLLING METHOD

(71) Applicant: Yuuki Imaizumi, Kanagawa (JP)

(72) Inventor: Yuuki Imaizumi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 257 days.

(21) Appl. No.: 13/727,127

(22) Filed: Dec. 26, 2012

(65) Prior Publication Data
US 2013/0166935 A1 Jun. 27, 2013

(30) Foreign Application Priority Data

Dec. 26, 2011 (JP) ................................. 2011-284199

(51) Int. Cl.
*G06F 1/32* (2006.01)
*G06F 1/26* (2006.01)

(52) U.S. Cl.
CPC .............. *G06F 1/3268* (2013.01); *G06F 1/263* (2013.01); *G06F 1/3284* (2013.01); *Y02B 60/1267* (2013.01); *Y02B 60/1246* (2013.01)

(58) Field of Classification Search
CPC ............................ G06F 1/3268; G06F 1/3284
USPC ................... 713/320, 323; 358/1.14
See application file for complete search history.

(56) References Cited

U.S. PATENT DOCUMENTS

| 7,409,414 | B2* | 8/2008 | Okada et al. ................... 707/648 |
| 7,840,766 | B2* | 11/2010 | Eguchi et al. ................. 711/162 |
| 8,095,510 | B2* | 1/2012 | Zlotnick ........................ 707/639 |
| 8,352,933 | B2* | 1/2013 | Amann et al. ................. 717/170 |
| 8,706,989 | B2* | 4/2014 | Zhang et al. ................... 711/162 |
| 2009/0066988 | A1 | 3/2009 | Imaizumi | |
| 2010/0238507 | A1 | 9/2010 | Matsushima et al. | |

FOREIGN PATENT DOCUMENTS

| JP | 2008-131603 | 6/2008 |
| JP | 2010-173318 | 8/2010 |
| JP | 2010-218399 | 9/2010 |
| JP | 2011-061309 | 3/2011 |

* cited by examiner

*Primary Examiner* — Stefan Stoynov

(74) *Attorney, Agent, or Firm* — Oblon, McClelland, Maier & Neustadt, L.L.P.

(57) ABSTRACT

In an embodiment, provided is a control device that operates: in a second mode where electric power to each of a processing unit and a second storage unit is stopped and is supplied to a first storage unit; and in a first mode where first control information controlling a state of the processing unit is stored in the second storage unit and electric power to each of the processing unit, and the first and second storage unit is stopped. When shifted from the first to second mode, the power supply control unit starts supply of electric power to each of the processing unit and the first storage unit. If the processing unit has been made to be in an operable first state, the processing unit creates and stores second control information in the first storage unit. Then, the power supply control unit stops electric power to the processing unit.

5 Claims, 8 Drawing Sheets

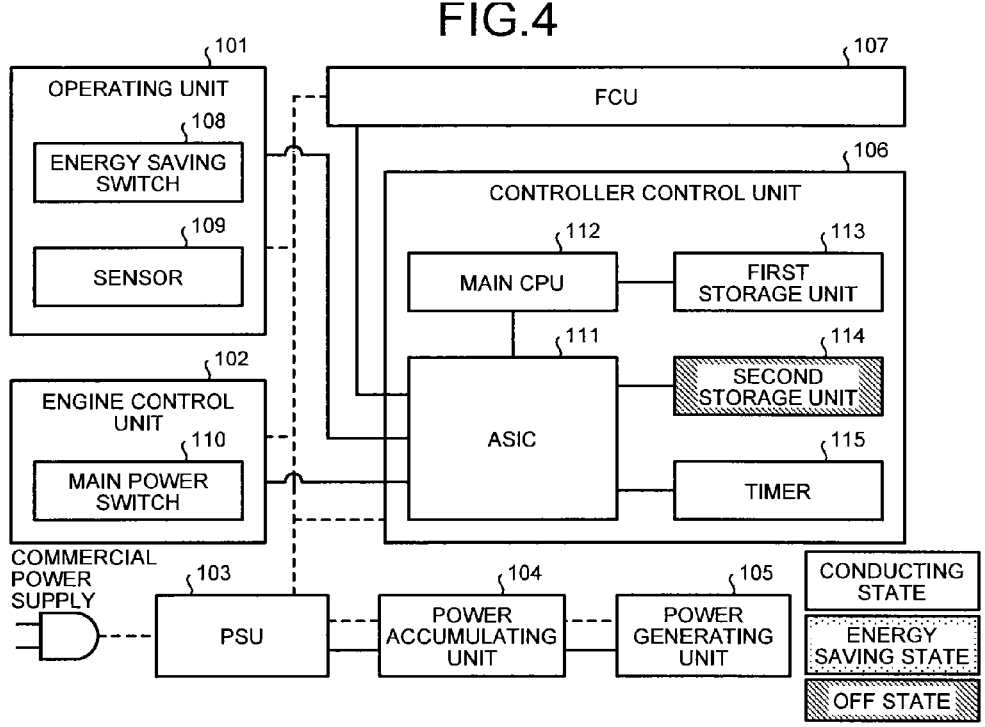
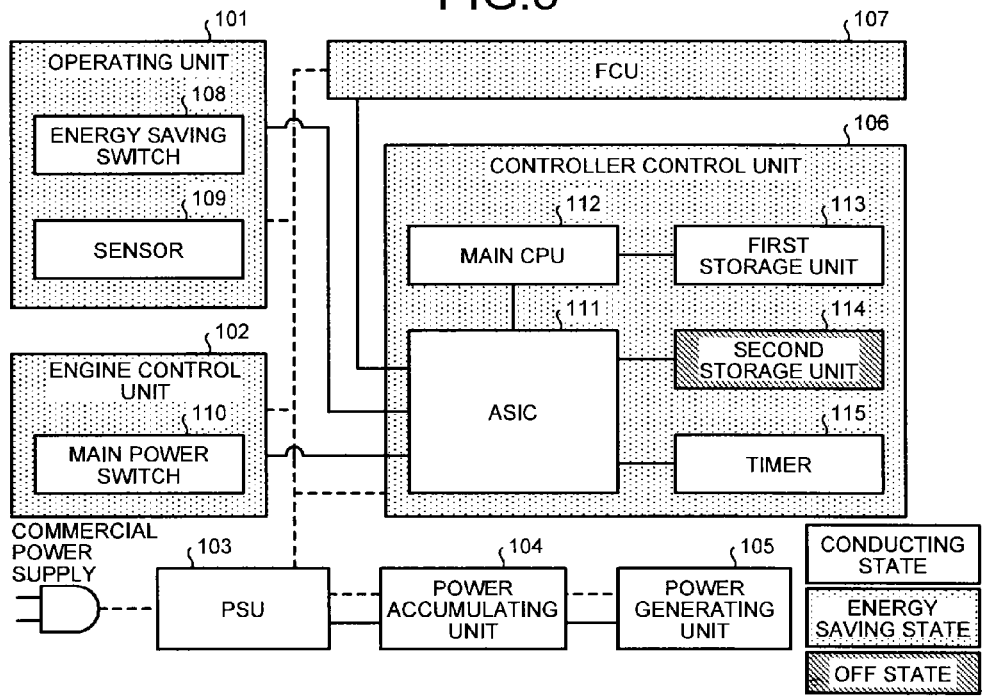

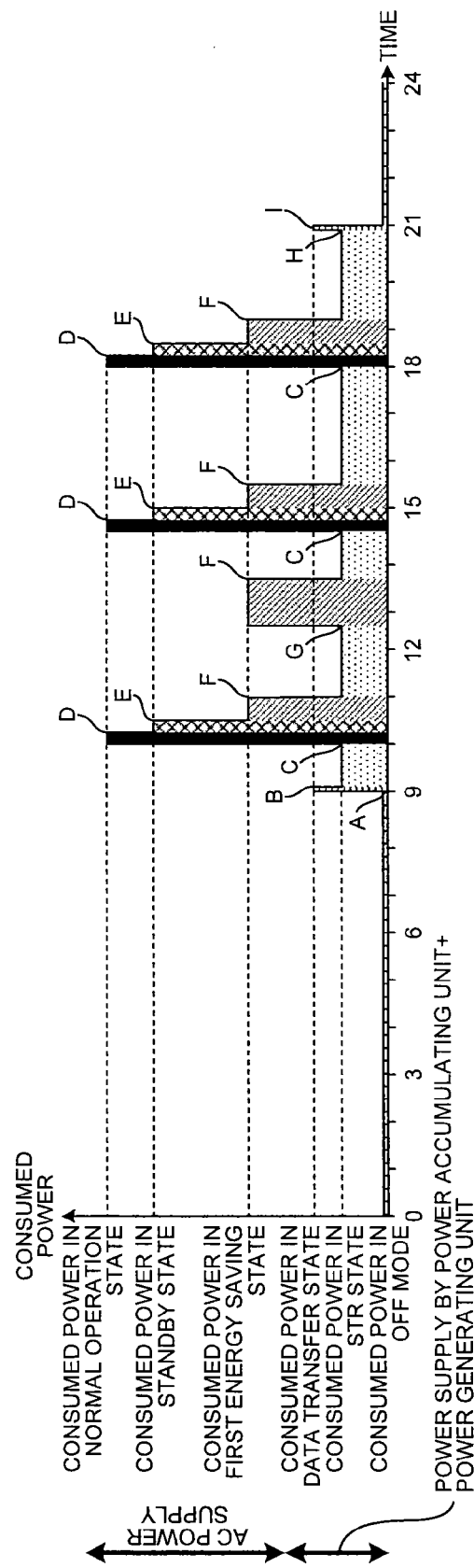

CONTROL DEVICE AND COMPUTER PROGRAM PRODUCT FOR CONTROLLING METHOD

CROSS-REFERENCE TO RELATED APPLICATIONS

The present application claims priority to and incorporates by reference the entire contents of Japanese Patent Application No. 2011-284199 filed in Japan on Dec. 26, 2011.

BACKGROUND OF THE INVENTION

1. Field of the Invention

The present invention relates to a control device and a computer program product for controlling method.

2. Description of the Related Art

Conventionally, various techniques for reducing the power consumption of an electronic apparatus have been known. For example, a digital Multi Function Peripheral (MFP) having a normal mode in which processing such as printing can be executed and an energy saving mode in which power consumption is smaller than that in the normal mode has been disclosed in Japanese Patent Application Laid-open No. 2010-218399. In Japanese Patent Application Laid-open No. 2010-218399, when a condition under which the digital MFP is shifted to be in the energy saving mode from the normal mode has been satisfied, a snapshot indicating information of operation environment is created to be stored in a non-volatile memory; and the digital MFP is shifted to be in the energy saving mode. Furthermore, Japanese Patent Application Laid-open No. 2010-218399 also discloses a technique in which one energy saving mode can be shifted into another energy saving mode directly.

Japanese Patent Application Laid-open No. 2010-218399, however, has no description on detailed contents when states are shifted from an OFF mode in which power consumption is the smallest among energy saving modes to a suspend-to-RAM (STR) mode as an energy saving mode in which electric power is supplied to a volatile memory and snapshot is held in the volatile memory.

For example, the following configuration is supposed. That is, in the configuration, when an activation time indicating a time during which electric power is supplied to a CPU and the CPU is made to be in an operable first state exceeds a threshold, energy saving control is performed such that a state of the CPU is set to a second state in which power consumption is smaller than that in the first state. In this case, the above-mentioned threshold is contained in snapshot. It is assumed that when states are shifted from the OFF mode to the STR mode, the snapshot held in the non-volatile memory is written into the volatile memory as it is. In this case, the CPU is activated once and executes writing of the snapshot. Therefore, the activation time is counted for an amount of a time in which the CPU has been activated temporarily. Accordingly, a time, until the CPU is shifted to be in the second state after having been recovered to be in the first state next, is shortened by an amount of the counted activation time. Therefore, the CPU is shifted to be in the second state at an unexpected time.

Furthermore, Japanese Patent Application Laid-open No. 2010-218399 has no description on detailed contents when states are shifted from the STR mode to the OFF mode. It is assumed that the snapshot held in the volatile memory is written into the non-volatile memory as it is when states are shifted from the STR mode to the OFF mode. In this case, the CPU is activated once and executes writing of the snapshot. Therefore, the activation time is counted for an amount of a time in which the CPU has been activated temporarily. Accordingly, a time until the CPU is shifted to be in the second state after having been recovered to be in the first state is shortened by an amount of the counted activation time. Therefore, the CPU is shifted to be in the second state at an unexpected time. As described above, there is a problem that energy saving control cannot be performed accurately with the technique that has been disclosed in Japanese Patent Application Laid-open No. 2010-218399.

There is a need to provide a control device and computer program product for controlling method that can perform energy saving control accurately.

SUMMARY OF THE INVENTION

It is an object of the present invention to at least partially solve the problems in the conventional technology.

In an embodiment, provided is a control device that includes: a processing unit that executes processing; a first storage unit as a volatile storage unit; a second storage unit as a non-volatile storage unit, and a power supply control unit that controls to supply and stop supply of electric power to each of the processing unit, the first storage unit, and the second storage unit. When the control device is shifted into a second mode in which supply of electric power to each of the processing unit and the second storage unit is stopped and electric power is supplied to the first storage unit from a first mode in which first control information to be used for controlling a state of the processing unit is stored in the second storage unit and supply of electric power to each of the processing unit, the first storage unit, and the second storage unit is stopped, the power supply control unit starts supply of electric power to each of the processing unit and the first storage unit. If electric power has been supplied to the processing unit and the processing unit has been made to be in an operable first state, the processing unit creates second control information that is different from the first control information and stores the second control information in the first storage unit. The power supply control unit stops supply of electric power to the processing unit after the second control information created by the processing unit has been stored in the first storage unit.

In another embodiment, provided is a control device that includes: a processing unit that executes processing; a first storage unit as a volatile storage unit; a second storage unit as a non-volatile storage unit; and a power supply control unit that controls to supply and stop supply of electric power to each of the processing unit, the first storage unit, and the second storage unit. When the control device is shifted into a fourth mode in which supply of electric power to each of the processing unit, the first storage unit, and the second storage unit is stopped from a third mode in which third control information to be used for controlling a state of the processing unit is stored in the first storage unit, electric power is supplied to the first storage unit and supply of electric power to each of the processing unit and the second storage unit is stopped, the power supply control unit starts supply of electric power to each of the processing unit and the second storage unit. If electric power has been supplied to the processing unit and the processing unit has been made to be in an operable first state, the processing unit creates fourth control information that is different from the third control information and stores the fourth control information in the second storage unit. The power supply control unit stops supply of electric power to each of the processing unit, the first storage unit, and the second storage unit; after the fourth control information created by the processing unit has been stored in the second storage unit.

In still another embodiment, provided is a computer program product that includes a non-transitory computer usable medium having computer readable program codes embodied in the medium that when executed causes a computer to execute a method for controlling a control device that includes: a processing unit that executes processing; a first storage unit as a volatile storage unit; a second storage unit as a non-volatile storage unit, and a power supply control unit that controls to supply and stop supply of electric power to each of the processing unit, the first storage unit, and the second storage unit. The method includes: starting, by the power supply control unit, supply of electric power to each of the processing unit and the first storage unit when the control device is shifted into a second mode in which supply of electric power to each of the processing unit and the second storage unit is stopped and electric power is supplied to the first storage unit from a first mode in which first control information to be used for controlling a state of the processing unit is stored in the second storage unit and supply of electric power to each of the processing unit, the first storage unit, and the second storage unit is stopped; creating, by the processing unit, second control information that is different from the first control information so as to store the second control information in the first storage unit, if electric power has been supplied to the processing unit and the processing unit has been made to be in an operable first state; and stopping, by the power supply control unit, supply of electric power to the processing unit after the second control information created by the processing unit has been stored in the first storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating a power supply example in a normal operation state and a normal standby state;

FIG. 5 is a diagram illustrating a power supply example in a first energy saving state;

FIG. 13 is a graph illustrating an example of a relation between the time and consumed power of the image forming apparatus.

DETAILED DESCRIPTION OF THE PREFERRED EMBODIMENTS

Hereinafter, embodiments of a control device and an electronic apparatus are described in detail with reference to the accompanying drawings. It is to be noted that in the following embodiments, an image forming apparatus having a function of forming an image on a medium is described as an example of the electronic apparatus. However, the electronic apparatus is not limited thereto and the type of the electronic apparatus is arbitrary.

Figure 1:
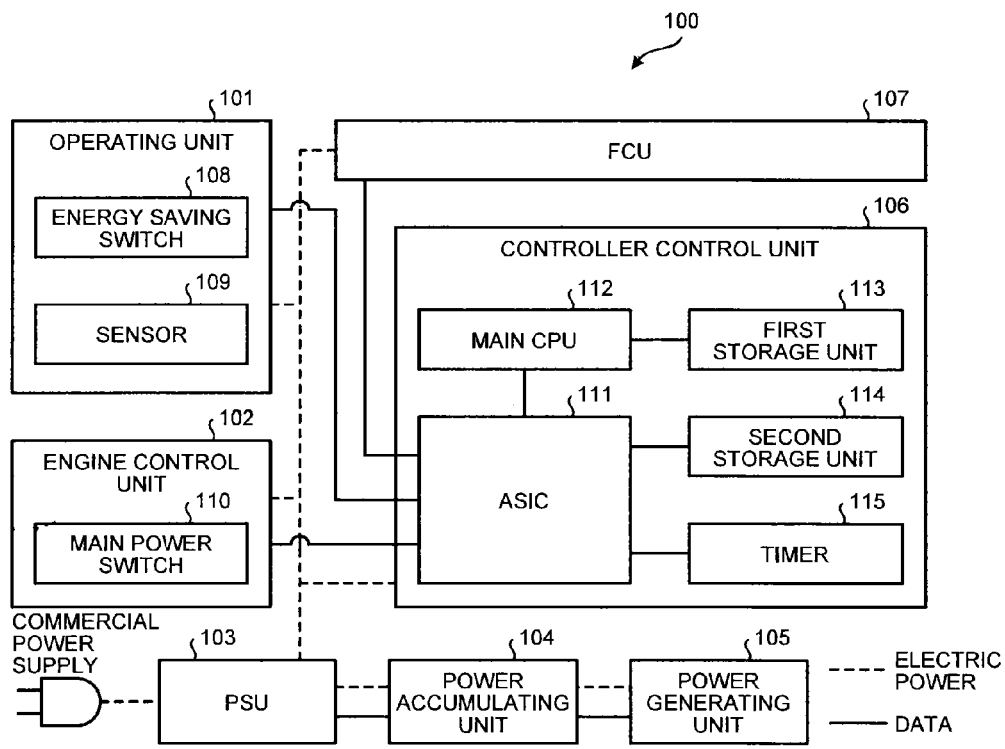
FIG. 1 is a block diagram illustrating a configuration example of an image forming apparatus according to an embodiment.

FIG. 1 is a diagram illustrating a schematic configuration example of an image forming apparatus 100 according to the embodiment. As illustrated in FIG. 1, the image forming apparatus 100 includes an operating unit 101, an engine control unit 102, a power supply unit (PSU) 103, a power accumulating unit 104, a power generating unit 105, a controller control unit 106, and a fax control unit (FCU) 107. In the following description, a state in which the image forming apparatus 100 can execute processing such as printing (an operable state, also including a standby state) is referred to as a "normal state", and a state in which power consumption is smaller than that in the normal state is referred to as an "energy saving state" in some cases.

The operating unit 101 is a user interface on which an operation panel and the like are mounted. The operating unit 101 includes an energy saving switch 108 and a sensor 109 in addition to the operation panel. In the energy saving state, electric power is supplied to a part of the operating unit 101 (for example, the sensor 109) only. The energy saving switch 108 is operated to be pressed by a user so as to input a signal for requesting to shift or recover to be in a desired energy saving state to the controller control unit 106. In this example, the energy saving switch 108 is provided on the operating unit 101. However, an installation place of the energy saving switch 108 is not limited thereto and is arbitrary. The sensor 109 detects an energy saving recovery factor (factor of recovery from the energy saving state) from the outside. In this example, the sensor 109 is provided on the operating unit 101. However, an installation place of the sensor 109 is not limited thereto and is arbitrary.

The engine control unit 102 mainly performs image formation. To be more specific, the engine control unit 102 controls to form an image on a medium such as a recording sheet under control of the controller control unit 106. Contents of the image formation control by the engine control unit 102 are well known and description of devices (for example, conveying system motor, fan, image forming unit, fixing unit) as control targets by the engine control unit 102 are omitted. In the energy saving state, almost all functions of the engine control unit 102 are stopped. In the embodiment, the engine control unit 102 includes a main power switch 110. The main power switch 110 inputs a signal for requesting to start or stop supply of electric power to the image forming apparatus 100 into the controller control unit 106 in accordance with a pressing operation by the user. The controller control unit 106 controls the power supply unit 103 so as to perform power supply control in accordance with the signal input from the main power switch 110. In this example, the main power switch 110 is provided on the engine control unit 102. However, an installation place of the main power switch 110 is not limited thereto and is arbitrary.

The power supply unit 103 can supply electric power to each of the operating unit 101, the engine control unit 102, the controller control unit 106, and the FCU 107 individually under control of the controller control unit 106. Furthermore, the power supply unit 103 selects to supply electric power from each of the power accumulating unit 104 and the power generating unit 105 to each part (the operating unit 101, the engine control unit 102, the controller control unit 106, and the FCU 107) or to supply electric power from a commercial power supply (AC power supply) to each part in accordance with electric power conditions of the power accumulating unit 104 and the power generating unit 105. For example, the power supply unit 103 can select to supply electric power from the commercial power supply to each part when the total of the electric power that can be supplied from each of the power accumulating unit 104 and the power generating unit 105 is lower than a first predetermined value. Furthermore, for example, the power supply unit 103 can select to supply electric power from each of the power accumulating unit 104 and the power generating unit 105 to each part when the total of the electric power that can be supplied from each of the power accumulating unit 104 and the power generating unit 105 exceeds a second predetermined value. It is to be noted that the selection is an example and the power supply unit 103 can select to supply electric power from each of the power accumulating unit 104 and the power generating unit 105 to each part or to supply electric power from the commercial power supply to each part in accordance with the electric power conditions of the power accumulating unit 104 and the power generating unit 105.

The power accumulating unit 104 accumulates electric power generated by the power generating unit 105. The power accumulating unit 104 may be configured with a battery that can charge and discharge electric power, for example. The power generating unit 105 generates electric power that is different from (unrelated to) electric power from the commercial power supply. The power generating unit 105 may be configured with a solar battery, for example.

The controller control unit 106 controls the whole image forming apparatus 100. As will be described later, a conducting state in the controller control unit 106 is different depending on a set state of the image forming apparatus 100. Furthermore, the FCU 107 controls a FAX.

As illustrated in FIG. 1, the controller control unit 106 includes an ASIC 111, a main CPU 112, a first storage unit 113, a second storage unit 114, and a timer 115. The ASIC 111 controls an energy saving state, controls an external apparatus, and so on under control of the main CPU 112. For example, control of the energy saving state is started when a trigger from the energy saving switch 108, the sensor 109, the timer 115, or the like or a trigger from an external apparatus has been detected. Furthermore, when the image forming apparatus 100 is shifted to be in an OFF mode (which will be described later) indicating a state in which power consumption is the smallest among the energy saving states and functions capable of being executed are small, the ASIC 111 also transfers data for retreating "snapshot" as control information to be used for controlling a state of the main CPU 112 to the second storage unit 114. In the embodiment, when an activation time indicating a time during which electric power is supplied to the main CPU 112 and the main CPU 112 is made in an operable state (referred to as "first state") exceeds a threshold, the ASIC 111 controls to shift the state of the main CPU 112 to the second state in which power consumption is smaller than that in the first state. Furthermore, the above-mentioned threshold is contained in the snapshot. In addition, another CPU that is different from the main CPU 112 is mounted in the ASIC 111. In the energy saving state in which supply of the electric power to the main CPU 112 is stopped and the main CPU 112 cannot be operated, the CPU performs various pieces of operation processing instead of the main CPU 112 in some cases. The main CPU 112, the first storage unit 113, the second storage unit 114, the timer 115, the operating unit 101, the engine control unit 102, and the power supply unit 103 are connected to the ASIC 111.

The main CPU 112 executes various types of control programs so as to control the image forming apparatus 100 collectively. The first storage unit 113 is configured with a volatile memory. In the normal state, data necessary for operating the image forming apparatus 100 such as information indicating a state of the image forming apparatus 100 and the control programs, is stored in the first storage unit 113. In a STR state which will be described later, power consumption is smaller than that in the normal state while the snapshot is kept being held in the first storage unit 113. Furthermore, in the OFF mode which will be described later, supply of electric power to the first storage unit 113 is stopped and the data in the first storage unit 113 is deleted.

The second storage unit 114 is configured with a non-volatile memory. In the embodiment, the second storage unit 114 is used only in the OFF mode and the snapshot is held therein. In the embodiment, the second storage unit 114 is not used unless the image forming apparatus 100 is shifted to be in the OFF mode.

The timer 115 clocks the time and outputs a signal as a trigger for which the state of the image forming apparatus 100 is shifted to the ASIC. For example, the timer 115 can also measure a period in which processing such as printing is not performed in the normal state, and if the measured time has reached a predetermined length, the timer 115 can output a signal indicating the fact. Furthermore, for example, if the measured time has reached a time at which the image forming apparatus 100 should be set to be in a predetermined state (for example, OFF mode), the timer 115 can also output a signal indicating the fact (that is to say, a signal as a trigger for which the state of the image forming apparatus 100 is shifted to the predetermined state).

Figure 2:
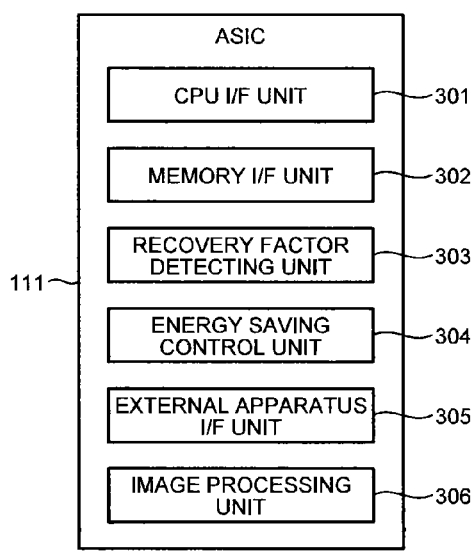
FIG. 2 is a block diagram illustrating a functional configuration example of an ASIC.

FIG. 2 is a block diagram illustrating a functional configuration example of the ASIC 111. An example, in which functions as illustrated in FIG. 2 are realized by one ASIC 111, is described. However, the present invention is not limited thereto; and a configuration in which a plurality of ASICs or microcomputers are combined to realize the functions as illustrated in FIG. 2 may be employed. As illustrated in FIG. 2, the ASIC 111 includes a CPU I/F unit 301, a memory I/F unit 302, a recovery factor detecting unit 303, an energy saving control unit 304, an external apparatus I/F unit 305, and an image processing unit 306.

The CPU I/F unit 301 functions as an interface with the main CPU 112. The memory I/F unit 302 functions as an interface with the second storage unit 114. In the embodiment, the memory I/F unit 302 does not operate (operation OFF) when the image forming apparatus 100 is in a state other than a data transfer state, which will be described later. The recovery factor detecting unit 303 detects a factor for which the image forming apparatus 100 is recovered to be in a predetermined state. The recovery factor can be set arbitrarily, and, for example, a signal as a trigger from the timer 115 or an external apparatus can be set as the recovery factor. There is no problem if elements that are set as the recovery factors are made into states in which the operations thereof are performed all the time (operation ON) and elements that are not set as the recovery factors are made into states in which the operations thereof are stopped (operation OFF).

The energy saving control unit 304 performs energy saving control of the image forming apparatus 100. To be more specific, the energy saving control unit 304 performs electric power control of each part. Basically, the energy saving control unit 304 is in the operating state (operation ON) all the time. Furthermore, the energy saving control unit 304 determines whether the image forming apparatus 100 performs predetermined processing (for example, printing processing) immediately after the recovery based on the factor detected by the recovery factor detecting unit 303. In other words, the energy saving control unit 304 determines whether the image forming apparatus 100 is used immediately after the recovery. Moreover, in the embodiment, when the activation time of the main CPU 112 exceeds the threshold, the energy saving control unit 304 controls the power supply unit 103 such that the state of the main CPU 112 is set to the second state in which the power consumption is smaller than that in the first state.

The external apparatus I/F unit 305 is provided individually for each external apparatus such as a USB and an Ethernet (registered trademark) and functions as an interface with the corresponding external apparatus. Furthermore, the external apparatus I/F unit 305 can also control the corresponding external apparatus. The external apparatus I/F unit 305 corresponding to an external apparatus that is registered as a recovery factor is in the operating state (operation ON) all the time. The external apparatus I/F unit 305 corresponding to an external apparatus that is not registered as the recovery factor is not required to be in the operating state all the time.

The image processing unit 306 performs image processing on each image input to the image forming apparatus 100 or each image output from the image forming apparatus 100. In the energy saving state, the image processing unit 306 is made in a stopped state.

Figure 3:
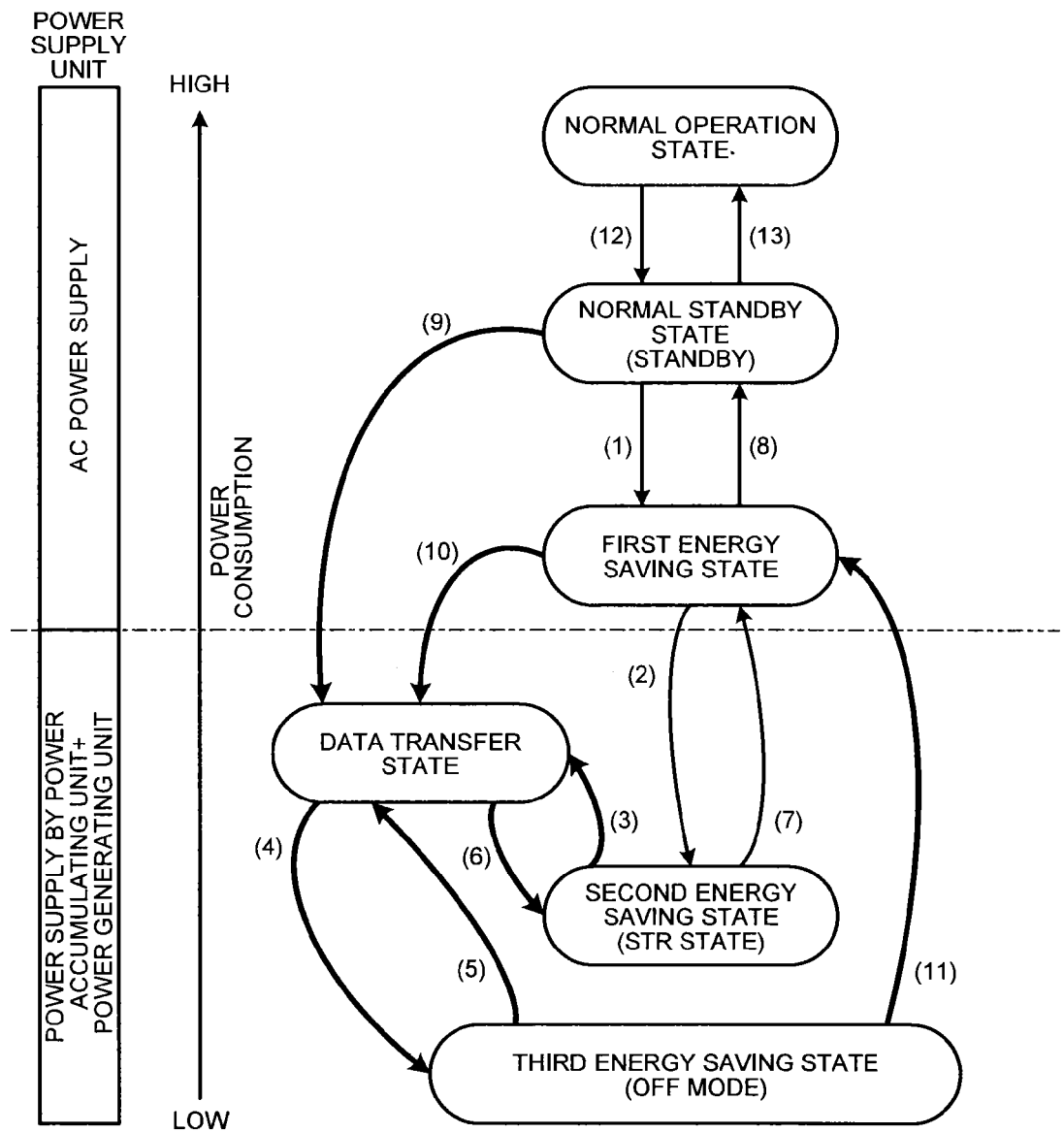
FIG. 3 is a diagram illustrating an example of state shift of the image forming apparatus.

FIG. 3 is a diagram illustrating shift of states of the image forming apparatus 100. As illustrated in FIG. 3, in the embodiment, there are two types including a "normal operation state" and a "normal standby state (Standby)" as the normal states. Furthermore, there are three types including a "first energy saving state", a "second energy saving state (hereinafter, referred to as "STR state"), and a "third energy saving state (hereinafter, referred to as "OFF mode") as the energy saving states. In addition, as a state other than the normal state and the energy saving state, there is a "data transfer state". Hereinafter, detailed contents are described.

The "normal operation state" is a state in which power consumption is the largest; and electric power is supplied from an AC power supply (commercial power supply). The "normal standby state" is a state in which power consumption is the second largest after the normal operation state; and electric power is supplied from the AC power supply. The difference in the power consumption between the normal standby state and the normal operation state is generated depending on availability ratios of internal modules and whether devices such as a motor operate.

As illustrated in FIG. 4, when the image forming apparatus 100 is in the "normal operation state" or the "normal standby state", the energy saving control unit 304 controls the power supply unit 103 such that electric power is supplied to each of the operating unit 101, the engine control unit 102, the FCU 107, the ASIC 111, the main CPU 112, the first storage unit 113, and the timer 115 while supply of electric power to the second storage unit 114 is stopped.

Description is continued while returning to FIG. 3, again. In the "first energy saving state", power consumption is smaller than that in the "normal standby state" and is larger than that in the "STR state"; and electric power is supplied from the AC power supply. Furthermore, for example, if the total of electric power that can be supplied from each of the power accumulating unit 104 and the power generating unit 105 exceeds a second predetermined value, electric power may be supplied from the power accumulating unit 104 and the power generating unit 105.

As illustrated in FIG. 5, in the "first energy saving state", the energy saving control unit 304 controls the power supply unit 103 such that electric power is supplied to the operating unit 101, the engine control unit 102, the FCU 107, the ASIC 111, the main CPU 112, the first storage unit 113, and the timer 115 while supply of electric power to the second storage unit 114 is stopped. In this case, electric power that is supplied to each of the operating unit 101, the engine control unit 102, each part of the controller control unit 106, and the FCU 107 is controlled to be a value that is smaller than that in the "normal standby state".

Description is continued while returning to FIG. 3, again. In the "STR state", power consumption is smaller than that in the "first energy saving state" and is larger than that in the "OFF mode", and electric power is supplied from the power accumulating unit 104 and the power generating unit 105 to the extent possible. However, for example, if the total of the electric power that can be supplied from each of the power accumulating unit 104 and the power generating unit 105 is lower than the first predetermined value, electric power may be supplied from the AC power supply.

Figure 6:
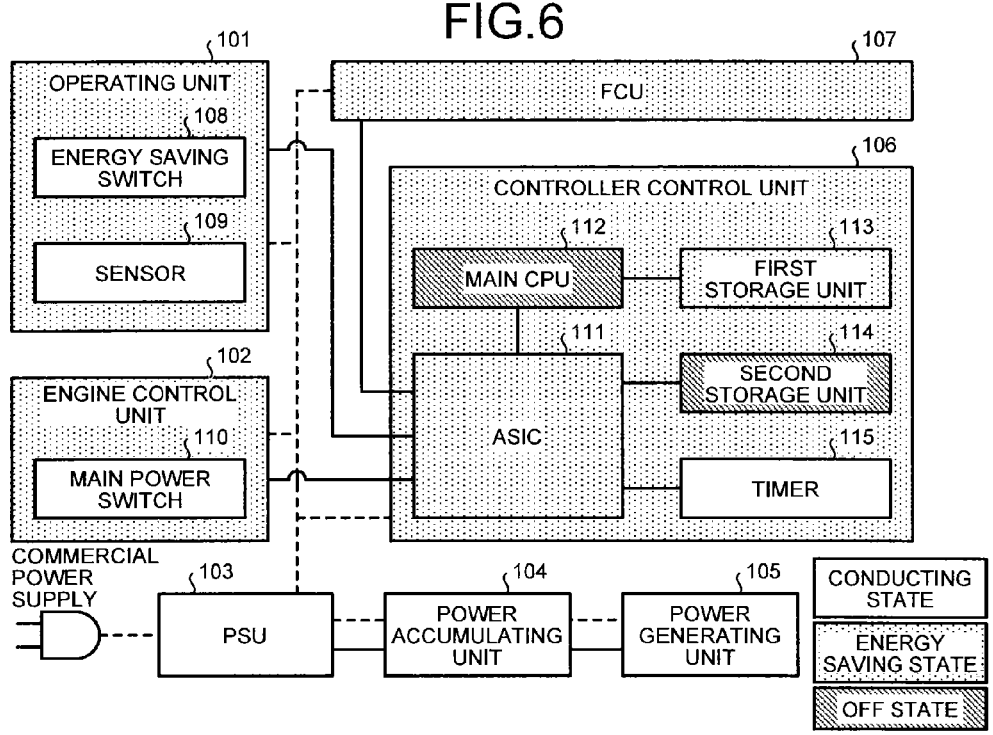
FIG. 6 is a diagram illustrating a power supply example in an STR state.

As illustrated in FIG. 6, in the "STR state", the energy saving control unit 304 controls the power supply unit 103 such that electric power is supplied to each of the operating unit 101, the engine control unit 102, the FCU 107, the ASIC 111, the first storage unit 113, and the timer 115 while supply of electric power to each of the main CPU 112 and the second storage unit 114 is stopped. In the example as illustrated in FIG. 6, electric power that is supplied to each of the operating unit 101, the engine control unit 102, and the FCU 107 is controlled to be a value that is the same as that in the "first energy saving state". On the other hand, the controller control unit 106 is made to be in a minimum conducting state. In the example as illustrated in FIG. 6, electric power that is supplied to each of the ASIC 111 and the first storage unit 113 is controlled to be a value that is further smaller than that in the "first energy saving state".

Description is continued while returning to FIG. 3, again. The "data transfer state" is a state in which the snapshot is transferred to the second storage unit 114 when the image forming apparatus 100 is shifted to be in the "OFF mode". Alternatively, the "data transfer state" is a state in which the snapshot held in the second storage unit 114 is transferred to the main CPU 112 when the image forming apparatus 100 is shifted to be in the "STR state" from the "OFF mode". In the "data transfer state", electric power is supplied from the power accumulating unit 104 and the power generating unit 105 to the extent possible. However, for example, if the total of the electric power that can be supplied from each of the power accumulating unit 104 and the power generating unit 105 is lower than the first predetermined value, electric power may be supplied from the AC power supply. In the "data transfer state", since electric power is supplied to each of the main CPU 112, the first storage unit 113, and the second storage unit 114, power consumption therein is larger than that in the STR state for the amount.

Figure 7:
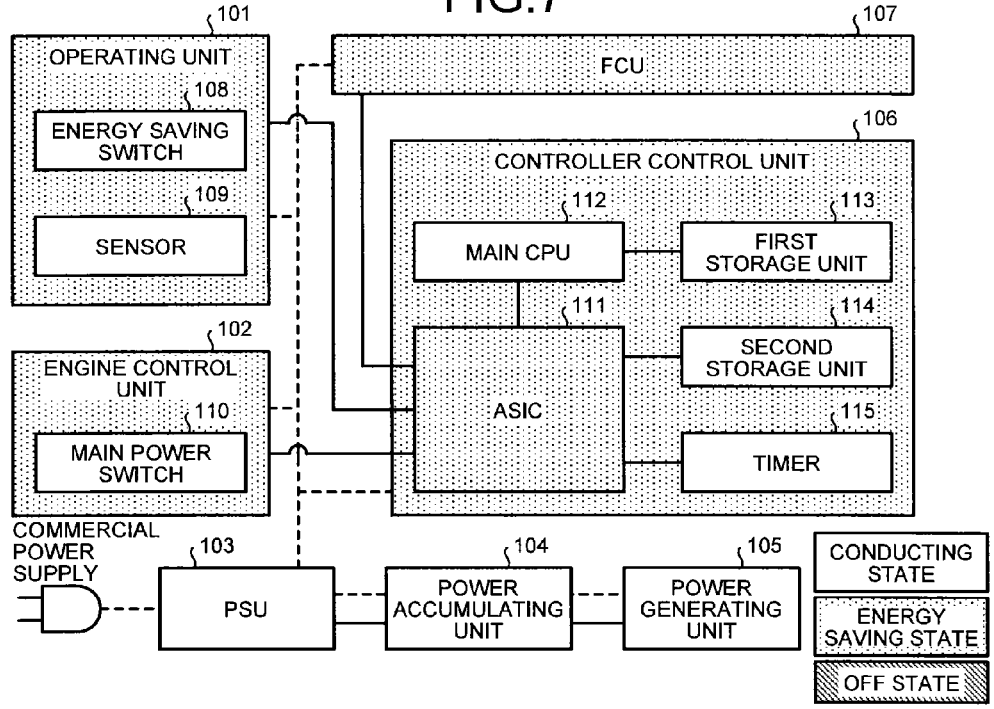
FIG. 7 is a diagram illustrating a power supply example in a data transfer state.

As illustrated in FIG. 7, in the "data transfer state", the energy saving control unit 304 controls the power supply unit 103 such that electric power is supplied to each of the operating unit 101, the engine control unit 102, the FCU 107, the ASIC 111, the main CPU 112, the first storage unit 113, the second storage unit 114 and the timer 115. In the example as illustrated in FIG. 7, electric power that is supplied to each of the operating unit 101, the engine control unit 102, the FCU 107, the main CPU 112, the first storage unit 113, and the timer 115 is controlled to be a value that is the same as that in the "first energy saving state". On the other hand, electric power that is supplied to the ASIC 111 is controlled to be a value that is the same as that in the "STR state".

Description is continued while returning to FIG. 3, again. The "OFF mode" is a state in which power consumption is the smallest among the energy saving states and electric power is supplied from the power accumulating unit 104 and the power generating unit 105 to the extent possible. However, for example, if the total of the electric power that can be supplied from each of the power accumulating unit 104 and the power generating unit 105 is lower than the first predetermined value, electric power may be supplied from the AC power supply. In the "OFF mode", power consumption is close to 0 W and only a specific recovery factor can be detected, so that almost all pieces of operation processing cannot be executed.

Figure 8:
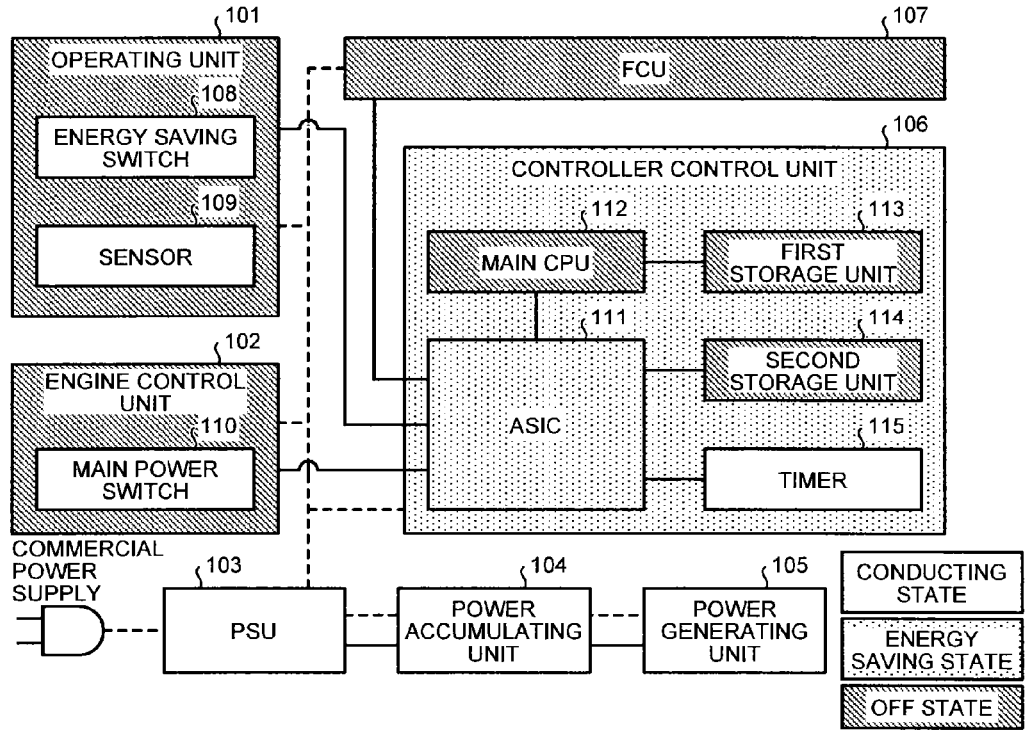
FIG. 8 is a diagram illustrating a power supply example in an OFF mode.

As illustrated in FIG. 8, in the "OFF mode", the energy saving control unit 304 controls the power supply unit 103 such that electric power is supplied to each of the ASIC 111 and the timer 115; while supply of electric power to each of the operating unit 101, the engine control unit 102, the FCU 107, the main CPU 112, the first storage unit 113, and the second storage unit 114 is stopped. In the example as illustrated in FIG. 8, electric power that is supplied to each of the ASIC 111 and the timer 115 is controlled to be a value that is the same as that in the "STR state (data transfer state)".

It is to be noted that although description is omitted, there is a power supply OFF mode (Shutdown) as another state of the image forming apparatus 100. In the power supply OFF mode, supply of electric power to each of the operating unit 101, the engine control unit 102, the controller control unit 106, and the FCU 107 is stopped. The state can be considered as a state in which the main power supply is in the OFF state.

Next, shift examples of the image forming apparatus 100 are described with reference to FIG. 3. First, a shift example from the "normal standby state" to the "first energy saving state" ((1) in FIG. 3) is described. In this example, in the normal standby state, when an operation by a user has not been performed for a certain period of time, the energy saving control unit 304 performs control such that the image forming apparatus 100 is shifted to be in the first energy saving state from the normal standby state (an example of energy saving control). It is to be noted that a factor as a trigger of the shift from the normal standby state to the first energy saving state can be set arbitrarily.

Next, a shift example from the "first energy saving state" to the "STR state" ((2) in FIG. 3) is described. In this example, in the first energy saving state, when an operation by the user has not been performed for a certain period of time, or when the user has operated to press the energy saving switch 108, so that a signal for requesting to shift to be in the STR state has been input, first, the main CPU 112 creates snapshot necessary for recovery and writes the created snapshot into the first storage unit 113. The energy saving control unit 304 performs control such that the image forming apparatus 100 is shifted to be in the STR state from the first energy saving state at a timing at which writing of the created snapshot into the first storage unit 113 has been completed. It is to be noted that a factor as a trigger of the shift from the first energy saving state to the STR state can be set arbitrarily.

Next, a shift example from the "STR state" to the "data transfer state", and then, from the "data transfer state" to the "OFF mode" ((3) to (4) in FIG. 3) is described. In this example, in the STR state, when the user has operated to press the energy saving switch 108, so that a signal for requesting to shift to be in the OFF mode has been input, or a signal indicating that the time has reached a predetermined time at which the image forming apparatus 100 is set to be in the OFF mode has been input from the timer 115, the energy saving control unit 304 performs control such that the image forming apparatus 100 is shifted to be in the OFF mode from the STR state through the data transfer state. Detailed contents of the control will be described later. It is to be noted that a factor as a trigger of the shift from the STR state to the OFF mode can be set arbitrarily.

Next, a shift example from the "OFF mode" to the "data transfer state", and then, from the "data transfer state" to the "STR state" ((5) to (6) in FIG. 3) is described. In this example, when a signal indicating that the time has reached a predetermined time at which the image forming apparatus 100 is recovered from the OFF mode has been input from the timer 115 and it has been determined that the image forming apparatus 100 is not used immediately after the recovery, the energy saving control unit 304 performs control such that the image forming apparatus 100 is shifted to be in the STR state from the OFF mode through the data transfer state. Detailed contents of the control will be described later. It is to be noted that a factor as a trigger of the shift from the OFF mode to the STR state can be set arbitrarily.

Next, a shift example from the "STR state" to the "first energy saving state" ((7) in FIG. 3) is described. In this example, in the STR state, when a recovery factor for which the image forming apparatus 100 is recovered to be in the first energy saving state has been detected by the recovery factor detecting unit 303, the energy saving control unit 304 performs control such that the image forming apparatus 100 is shifted to be in the first energy saving state from the STR state. It is to be noted that a factor as a trigger of the shift from the STR state to the first energy saving state can be set arbitrarily.

Next, a shift example from the "first energy saving state" to the "normal standby state" ((8) in FIG. 3) is described. In this example, in the first energy saving state, when a factor for which the image forming apparatus 100 should be recovered to be in the normal state from the energy saving state, such as reception of a request to perform printing processing, has been detected by the recovery factor detecting unit 303, the energy saving control unit 304 performs control such that the image forming apparatus 100 is shifted to be in the normal standby state from the first energy saving state. It is to be noted that a factor as a trigger of the shift from the first energy saving state to the normal standby state can be set arbitrarily. In addition, in the STR state, when a factor for which the image forming apparatus 100 is recovered to be in the normal standby state has been detected by the recovery factor detecting unit 303, the energy saving control unit 304 performs control such that the image forming apparatus 100 is shifted to be in the normal standby state from the STR state through the first energy saving state. It is to be noted that a factor as a trigger of the shift from the STR state to the normal standby state can be set arbitrarily.

Next, a shift example from the "normal standby state" to the "data transfer state", and then, from the "data transfer state" to the "OFF mode" ((9) to (4) in FIG. 3) is described. In this example, in the normal standby state, when the user has operated to press the energy saving switch 108, so that a signal for requesting to shift to be in the OFF mode has been input, or a signal indicating that the time has reached a predetermined time at which the image forming apparatus 100 is set to be in the OFF mode has been input from the timer 115, the energy saving control unit 304 performs control such that the image forming apparatus 100 is shifted to be in the OFF mode from the normal standby state through the data transfer state. Detailed contents of the control will be described later. It is to be noted that a factor as a trigger of the shift from the normal standby state to the OFF mode can be set arbitrarily.

Next, a shift example from the "first energy saving state" to the "data transfer state", and then, from the "data transfer state" to the "OFF mode" ((10) to (4) in FIG. 3) is described. In this example, in the first energy saving state, when the user has operated to press the energy saving switch 108, so that a signal for requesting to shift to be in the OFF mode has been input, or a signal indicating that the time has reached a predetermined time at which the image forming apparatus 100 is set to be in the OFF mode has been input from the timer 115, the energy saving control unit 304 performs control such that the image forming apparatus 100 is shifted to be in the OFF mode from the first energy saving state through the data transfer state. Detailed contents of the control will be described later. It is to be noted that a factor as a trigger of the shift from the first energy saving state to the OFF mode can be set arbitrarily.

Next, a shift example from the "OFF mode" to the "first energy saving state" ((11) in FIG. 3) is described. In this example, in the OFF mode, when the user has operated to press the energy saving switch 108, so that a signal for requesting to recover to be in the first energy saving state has been input, or a signal indicating that the time has reached a predetermined time at which the image forming apparatus 100 is recovered from the OFF mode has been input from the timer 115 and it has been determined that the image forming apparatus 100 is not used immediately after the recovery, the energy saving control unit 304 performs control such that the image forming apparatus 100 is shifted to be in the first energy saving state from the OFF mode. Detailed contents of the control will be described later. It is to be noted that a factor as a trigger of the shift from the OFF mode to the first energy saving state can be set arbitrarily.

Next, a shift example from the "OFF mode" to the "first energy saving state", and then, from the "first energy saving state" to the "normal standby state" ((11) to (8) in FIG. 3) is described. In this example, in the OFF mode, when the user has operated to press the energy saving switch 108, so that a signal for requesting to recover to be in the normal standby state has been input, or a signal indicating that the time has reached a predetermined time at which the image forming apparatus 100 is recovered from the OFF mode has been input from the timer 115 and it has been determined that the image forming apparatus 100 is used immediately after the recovery, the energy saving control unit 304 performs control such that the image forming apparatus 100 is shifted to be in the normal standby state from the OFF mode through the first energy saving state. It is to be noted that a factor as a trigger of the shift from the OFF mode to the normal standby state can be set arbitrarily.

Next, a shift example from the "normal operation state" to the "normal standby state" ((12) in FIG. 3) is described. In this example, when processing such as printing has been finished, the energy saving control unit 304 performs control such that the image forming apparatus 100 is shifted to be in the normal standby state from the normal operation state. In a shift example from the "normal standby state" to the "normal operation state" ((13) in FIG. 3), when processing such as printing is started, the energy saving control unit 304 performs control such that the image forming apparatus 100 is shifted to be in the normal operation state from the normal standby state.

Figure 9:
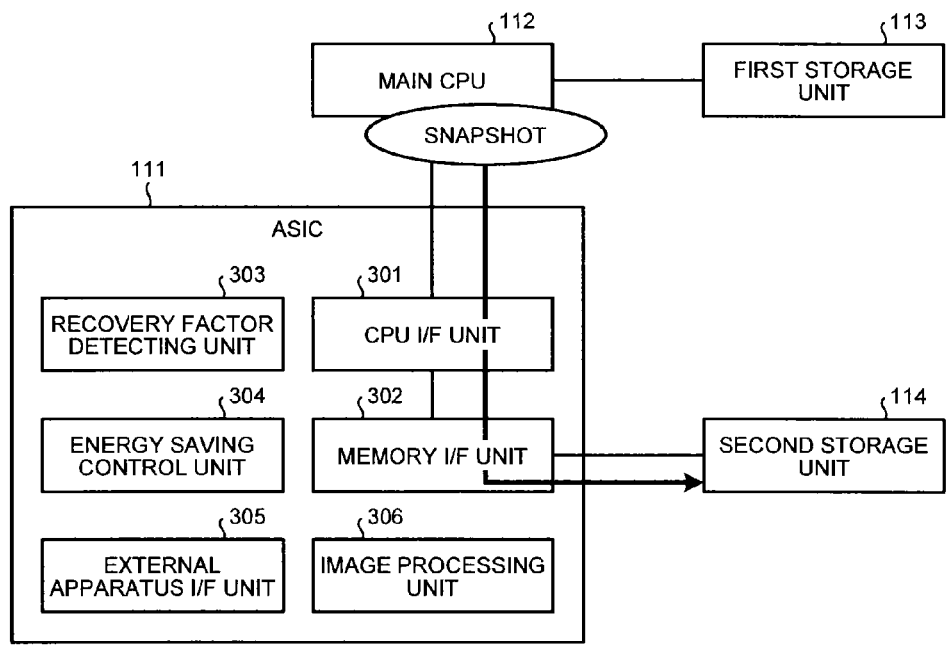
FIG. 9 is a diagram for explaining a specific example when states are shifted from the normal standby state to the OFF mode.

Next, a shift example from the "normal standby state" to the "data transfer state", and then, from the "data transfer state" to the "OFF mode" ((9) to (4) in FIG. 3) is described. In the normal standby state, since the main CPU 112 is in an operable state ("first state"), snapshot necessary for recovery of the main CPU 112 is not held anywhere. Therefore, when a factor as a trigger of the shift from the normal standby state to the OFF mode has been detected, first, the main CPU 112 creates snapshot necessary for the recovery. Then, in the data transfer state, the main CPU 112 writes the created snapshot into the second storage unit 114 through the CPU I/F unit 301 and the memory I/F unit 302. That is to say, the snapshot created by the main CPU 112 is transferred to the second storage unit 114. The energy saving control unit 304 controls the power supply unit 103 such that the image forming apparatus 100 is shifted to be in the "OFF mode" at a timing at which writing of the snapshot has been completed. It is to be noted that the shift example from the "first energy saving state" to the "data transfer state", and then, from the "data transfer state" to the "OFF mode" ((10) to (4) in FIG. 3) can be considered in the same manner as the example as illustrated in FIG. 9.

Next, detailed contents of the shift example from the "STR state" to the "data transfer state", and then, from the "data transfer state" to the "OFF mode" ((3) to (4) in FIG. 3) are described with reference to FIG. 10. When a factor as a trigger of the shift from the STR state to the OFF mode has been detected, the energy saving control unit 304 starts supply of electric power to each of the main CPU 112 and the second storage unit 114 and sets the image forming apparatus 100 to be in the data transfer state. If the electric power has been supplied to the main CPU 112 and the main CPU 112 has been made to be in the operable state (first state), the main CPU 112 loads and executes the snapshot held in the first storage unit 113. The activation time is counted for an amount that the main CPU 112 has been activated temporarily when states are shifted from the STR state to the OFF mode. Therefore, when the snapshot held in the first storage unit 113 in the STR state is transferred to the second storage unit 114 as it is, the time until the main CPU 112 is shifted to be in the second state after being recovered to be in the first state next is shortened by the counted activation time. Therefore, there arises a problem that the main CPU 112 is shifted to be in the second state at an unexpected time.

Figure 10:
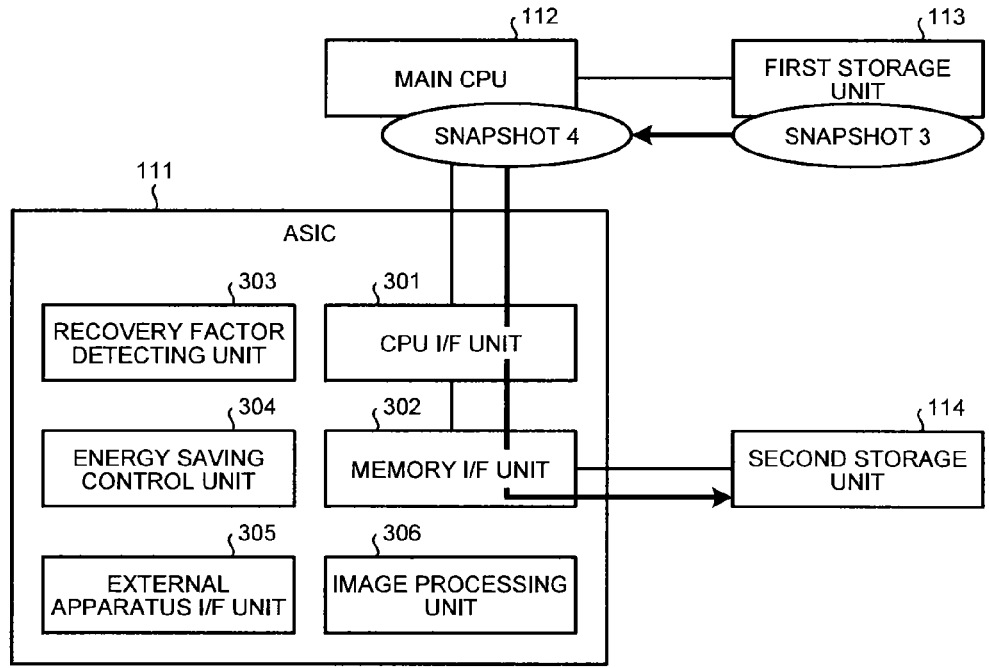
FIG. 10 is a diagram for explaining a specific example when states are shifted from the STR state to the OFF mode.

In order to avoid the problem, in the example as illustrated in FIG. 10, the activated main CPU 112 creates snapshot (hereinafter, expressed as "snapshot 4") that is different from the snapshot (hereinafter, expressed as "snapshot 3") held in the first storage unit 113. To be more specific, the main CPU 112 sets a value obtained by adding a reset time indicating the time during which the main CPU 112 is made to be in the first state temporarily when the image forming apparatus 100 is shifted to be in the OFF mode from the STR state to a third threshold indicating a threshold contained in the snapshot 3 as a fourth threshold indicating a threshold contained in the snapshot 4. This can prevent the main CPU 112 from being shifted to be in the second state at the unexpected time. It is to be noted that a measured result of the time during which the main CPU 112 is made to be in the first state temporarily when the image forming apparatus 100 is shifted to be in the OFF mode from the STR state may be employed as the reset time or a predetermined value may be employed as the reset time.

Then, in the data transfer state, the main CPU 112 writes the created snapshot 4 into the second storage unit 114 through the CPU I/F unit 301 and the memory I/F unit 302. That is to say, the snapshot 4 that has been created newly is transferred to the second storage unit 114. The energy saving control unit 304 controls the power supply unit 103 such that the image forming apparatus 100 is shifted to be in the "OFF mode" at a timing at which writing of the snapshot 4 has been completed.

Next, detailed contents of the shift example from the "OFF mode" to the "data transfer state", and then, from the "data transfer state" to the "STR state" ((5) to (6) in FIG. 3) are described with reference to FIG. 11. In the OFF mode, snapshot (hereinafter, expressed as "snapshot 1") is held in the second storage unit 114. When a factor as a trigger of the shift from the OFF mode to the STR state has been detected, the energy saving control unit 304 starts supply of electric power to each of the main CPU 112, the first storage unit 113, and the second storage unit 114 and sets the image forming apparatus 100 to be in the data transfer state. If the electric power has been supplied to the main CPU 112 and the main CPU 112 has been made to be in the operable state (first state), the main CPU 112 loads and executes the snapshot 1. Also in this case, the activation time is counted for an amount that the main CPU 112 has been activated temporarily. Therefore, when the snapshot 1 held in the second storage unit 114 in the OFF mode is transferred to the first storage unit 113 as it is, the time until the main CPU 112 is shifted to be in the second state after being recovered to be in the first state next is shortened by the counted activation time. Therefore, there arises a problem that the main CPU 112 is shifted to be in the second state at an unexpected time.

Figure 11:
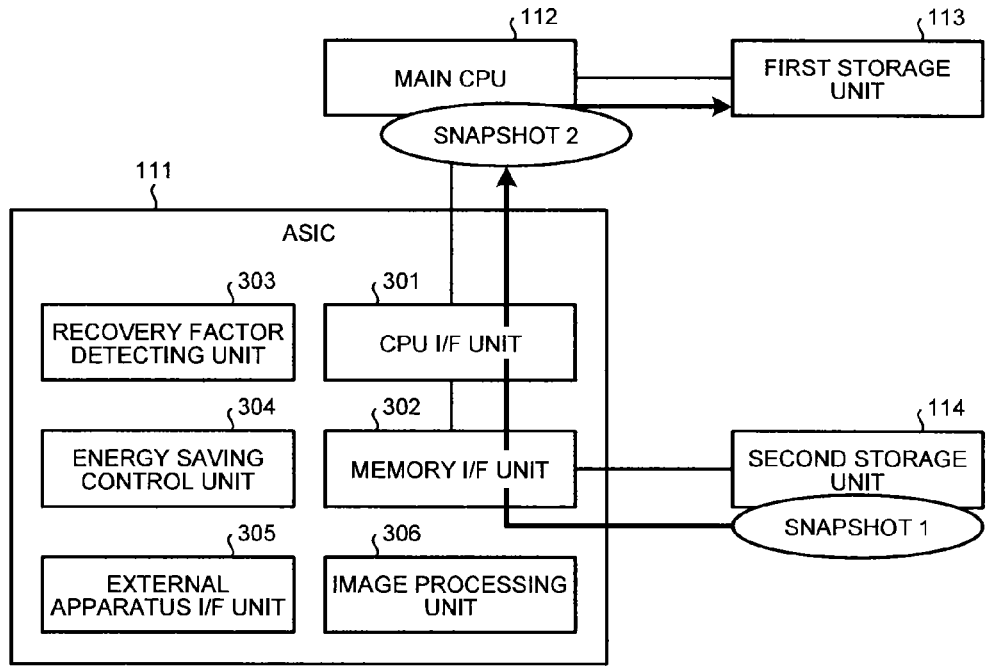
FIG. 11 is a diagram for explaining a specific example when states are shifted from the OFF mode to the STR state.

In order to avoid the problem, in the example as illustrated in FIG. 11, the activated main CPU 112 creates snapshot (hereinafter, expressed as "snapshot 2") that is different from the snapshot 1. To be more specific, the main CPU 112 sets a value obtained by adding a reset time indicating the time during which the main CPU 112 is made to be in the first state temporarily when the image forming apparatus 100 is shifted to be in the STR mode from the OFF state to a first threshold indicating a threshold contained in the snapshot 1 as a second threshold indicating a threshold contained in the snapshot 2. This can prevent the main CPU 112 from being shifted to be in the second state at the unexpected time. It is to be noted that a measured result of the time during which the main CPU 112 is made to be in the first state temporarily when the image forming apparatus 100 is shifted to be in the STR state from the OFF mode may be employed as the reset time or a predetermined value may be employed as the reset time.

Then, in the data transfer state, the main CPU 112 writes the created snapshot 2 into the first storage unit 113 through the CPU I/F unit 301 and the memory I/F unit 302. That is to say, the snapshot 2 that has been created newly is transferred to the first storage unit 113. The energy saving control unit 304 controls the power supply unit 103 such that the image forming apparatus 100 is shifted to be in the "STR state" at a timing at which writing of the snapshot 2 has been completed.

Figure 12:
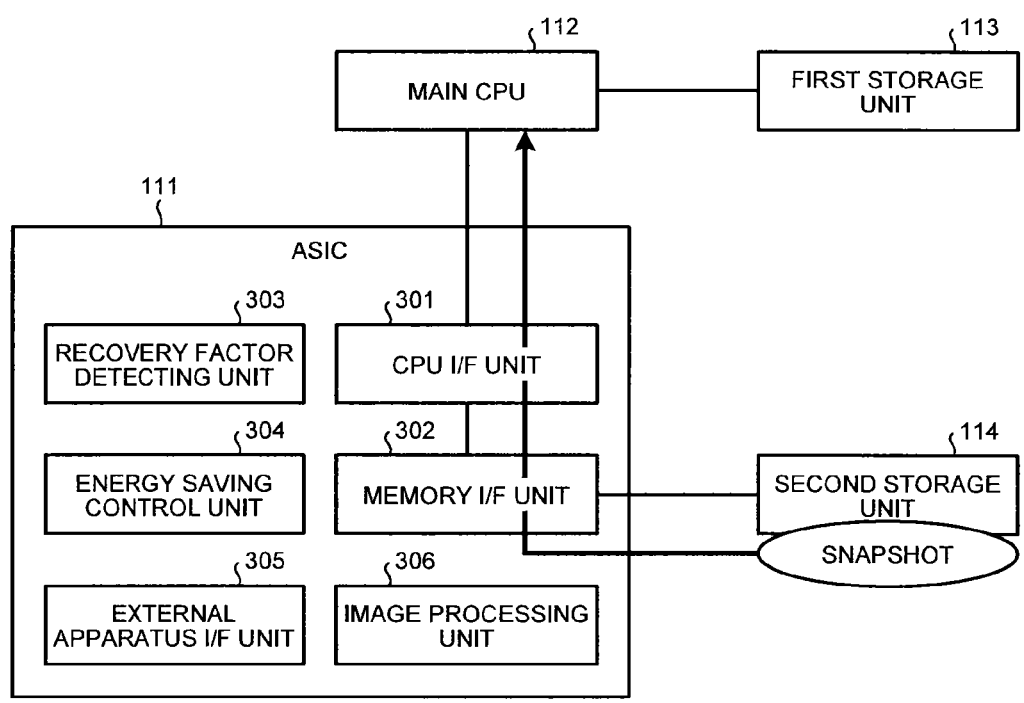
FIG. 12 is a diagram for explaining a specific example when states are shifted from the OFF mode to the first energy saving state.

Next, detailed contents of the shift example from the "OFF mode" to the "first energy saving state" ((11) in FIG. 3) are described with reference to FIG. 12. In the OFF mode, snapshot is held in the second storage unit 114. When a factor as a trigger of the shift from the OFF mode to the first energy saving state has been detected, the energy saving control unit 304 starts supply of electric power to each of the main CPU 112, the first storage unit 113, and the second storage unit 114. If the electric power has been supplied to the main CPU 112 and the main CPU 112 has been made to be in the operable state (first state), the main CPU 112 loads and executes the snapshot held in the second storage unit 114. Thereafter, the energy saving control unit 304 controls the power supply unit 103 such that electric power is supplied to each of the main CPU 112 and the first storage unit 113 while supply of electric power to the second storage unit 114 is stopped. With this, the image forming apparatus 100 is set to be in the first energy saving state.

FIG. 13 is a graph illustrating an example between a time and consumed power of the image forming apparatus 100. As illustrated in FIG. 13, the main CPU 112 is set to be in the OFF mode before a timing A. In the example as illustrated in FIG. 13, at the timing A, a factor as a trigger of the shift from the OFF mode to the STR state is detected and the energy saving control unit 304 performs control such that the image forming apparatus 100 is shifted to be in the STR state from the OFF mode through the data transfer state. In the example as illustrated in FIG. 13, at the timing A, a signal indicating that the time has reached a time (9:00 a.m. in the example as illustrated in FIG. 13) at which the image forming apparatus 100 is recovered from the OFF mode is input from the timer 115; and it is determined that the image forming apparatus 100 is not used immediately after the recovery.

Then, the energy saving control unit 304 starts supply of electric power to each of the main CPU 112, the first storage unit 113, and the second storage unit 114 and sets the image forming apparatus 100 to be in the data transfer state. If the electric power has been supplied to the main CPU 112 and the main CPU 112 has been made to be in the operable state (first state), the main CPU 112 loads and executes snapshot held in the second storage unit 114. The activated main CPU 112 creates snapshot that is different from the snapshot held in the second storage unit 114 and writes the created snapshot into the first storage unit 113. In the example as illustrated in FIG. 13, the energy saving control unit 304 controls the power supply unit 103 such that the image forming apparatus 100 is shifted to be in the STR state at a timing B at which writing of the snapshot that has been created newly has been completed. That is to say, the image forming apparatus 100 is set to be in the data transfer state in a period from the timing A to the timing B and is set to be in the STR state at the timing B.

After the image forming apparatus 100 has been set to be in the STR state, at a timing C, a factor as a trigger of the shift from the STR state to the normal operation state is detected; and the energy saving control unit 304 performs control such that the image forming apparatus 100 is shifted to be in the normal operation state from the STR state through the first energy saving state and the normal standby state. That is to say, in the example as illustrated in FIG. 13, the image forming apparatus 100 is set to be in the STR state in a period from the timing B to the timing C. Then, the image forming apparatus 100 is set to be in the normal operation state at the timing C and printing processing and the like are performed (normal operation is performed). In the example as illustrated in FIG. 13, the energy saving control unit 304 performs control such that the image forming apparatus 100 is shifted to be in the normal standby state from the normal operation state at a timing D at which the normal operation is finished. That is to say, in the example as illustrated in FIG. 13, the image forming apparatus 100 is set to be in the normal operation state in a period from the timing C to the timing D and is set to be in the normal standby state at the timing D.

After the image forming apparatus 100 has been set to be in the normal standby state, when an operation by a user has not been performed for a certain period of time, the energy saving control unit 304 performs control such that the image forming apparatus 100 is shifted to be in the first energy saving state from the normal standby state. In the example as illustrated in FIG. 13, a time from the timing D to a timing E is a threshold (the above-mentioned certain period of time) for shifting the states to the first energy saving state. However, the threshold is not limited thereto and can be set arbitrarily. In this example, an operation by a user has not been performed in the period from the timing D to the timing E. Therefore, the energy saving control unit 304 performs control such that the image forming apparatus 100 is shifted to be in the first energy saving state from the normal standby state at the timing E. That is to say, in the example as illustrated in FIG. 13, the image forming apparatus 100 is set to be in the normal standby state during the period from the timing D to the timing E, and is set to be in the first energy saving state at the timing E.

After the image forming apparatus 100 has been set to be in the first energy saving state, when an operation by a user has not been performed for a certain period of time, the energy saving control unit 304 performs control such that the image forming apparatus 100 is shifted to be in the STR state from the first energy saving state. In the example as illustrated in FIG. 13, a time from the timing E to timing F is a threshold (the above-mentioned certain period of time) for shifting the states to the STR state. However, the threshold is not limited thereto and can be set arbitrarily. In this example, an operation by a user has not been performed in the period from the timing E to the timing F. Therefore, the energy saving control unit 304 performs control such that the image forming apparatus 100 is shifted to be in the STR state from the first energy saving state to at the timing F. To be more specific, first, the main CPU 112 creates snapshot necessary for recovery and writes the created snapshot into the first storage unit 113. The energy saving control unit 304 controls the power supply unit 103 such that the image forming apparatus 100 is shifted to be in the STR state from the first energy saving state at a timing at which writing of the snapshot created by the main CPU 112 into the first storage unit 113 has been completed. That is to say, in the example as illustrated in FIG. 13, the image forming apparatus 100 is set to be in the first energy saving state in the period from the timing E to the timing F and is set to be in the STR state at the timing F.

In the example as illustrated in FIG. 13, in the STR state, a timing at which a factor as a trigger of the shift to the first energy saving state has been detected is assumed to be a timing G. At the timing G, the energy saving control unit 304 performs control such that the image forming apparatus 100 is shifted to be in the first energy saving state from the STR state. That is to say, in the example as illustrated in FIG. 13, the image forming apparatus 100 is set to be in the STR state in the period from the timing F to the timing G; and is set to be in the first energy saving state at the timing G.

In the example as illustrated in FIG. 13, in the STR state, a timing at which a factor as a trigger of the shift to the OFF mode has been detected is assumed to be a timing H. At the timing H, the energy saving control unit 304 performs control such that the image forming apparatus 100 is shifted to be in the OFF mode from the STR state through the data transfer state. In the example as illustrated in FIG. 13, a signal indicating that the time has reached a time (9:00 p.m. in the example as illustrated in FIG. 13) at which the image forming apparatus 100 is shifted to be in the OFF mode is input from the timer 115, so that the energy saving control unit 304 detects that the time corresponds to the timing at which the image forming apparatus 100 is shifted to be in the OFF mode.

Then, the energy saving control unit 304 starts supply of electric power to each of the main CPU 112, the first storage unit 113, and the second storage unit 114 and sets the image forming apparatus 100 to be in the data transfer state. If electric power has been supplied to the main CPU 112 and the main CPU 112 has been made to be in the operable state (first state), the main CPU 112 loads and executes the snapshot held in the first storage unit 113. The activated main CPU 112 creates snapshot that is different from the snapshot held in the first storage unit 113 and writes the created snapshot into the second storage unit 114. In the example as illustrated in FIG. 13, the energy saving control unit 304 controls the power supply unit 103 such that the image forming apparatus 100 is shifted to be in the OFF mode at a timing I at which writing of the snapshot that has been created newly has been completed. That is to say, the image forming apparatus 100 is set to be in the data transfer state in the period from the timing H to the timing I and is set to be in the OFF mode at the timing I.

As described above, the embodiment has been described. However, the present invention is not limited to the above-mentioned embodiment and various modifications can be made. The controller control unit 106 according to the above-mentioned embodiment corresponds to a control device and the image forming apparatus 100 according to the above-mentioned embodiment corresponds to an electronic apparatus.

Control programs to be executed in the controller control unit 106 according to the above-mentioned embodiment may be configured to be provided by being recorded in a recording medium that can be read by a computer, such as a compact disc read only memory (CD-ROM), a flexible disk (FD), a CD recordable (CD-R), or a digital versatile disk (DVD), in a format that can be installed or a file that can be executed.

Furthermore, the control programs to be executed in the controller control unit 106 according to the above-mentioned embodiment may be configured to be provided by being stored on a computer connected to network such as the Internet and by being downloaded through the network. Alternatively, the control programs to be executed in the controller control unit 106 according to the above-mentioned embodiment may be provided or distributed through network such as the Internet.

The embodiment can provide an advantageous effect of providing a control device and an electronic apparatus capable of performing energy saving control accurately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device comprising:
a processor that executes processing;
a first storage as a volatile storage;
a second storage as a non-volatile storage; and
a power supply controller that controls to supply and stop supply of electric power to each of the processor, the first storage, and the second storage, wherein
when the control device is shifted
into a second mode in which supply of electric power to each of the processor and the second storage is stopped and electric power is supplied to the first storage
from a first mode in which
first control information to be used for controlling a state of the processor is stored in the second storage and supply of electric power to each of the processor, the first storage unit, and the second storage is stopped, the power supply controller starts supply of electric power to each of the processor and the first storage;

if electric power has been supplied to the processor and the processor has been made to be in an operable first state, the processor creates second control information that is different from the first control information and stores the second control information in the first storage, and the power supply controller stops supply of electric power to the processor after the second control information created by the processor has been stored in the first storage.

2. The control device according to claim 1, wherein the power supply controller controls electric power to be supplied to the processor such that the processor is set to be in a second state in which power consumption is smaller than power consumption in the operable first state, when an activation time indicating a time during which the processor is made to be in the operable first state exceeds a threshold, and the processor sets
a value obtained by adding
a reset time indicating a time during which the processor is made to be in the operable first state temporarily when the control device is shifted into the second mode from the first mode
to a first threshold indicating the threshold contained in the first control information
as a second threshold indicating the threshold contained in the second control information.

3. A control device comprising:
a processor that executes processing;
a first storage as a volatile storage;
a second storage as a non-volatile storage; and
a power supply controller that controls to supply and stop supply of electric power to each of the processor, the first storage, and the second storage, wherein when the control device is shifted
into a second mode in which
supply of electric power to each of the processor, the first storage, and the second storage is stopped
from a first mode in which
first control information to be used for controlling a state of the processor is stored in the first storage unit,
electric power is supplied to the first storage and
supply of electric power to each of the processor and the second storage is stopped,
the power supply controller starts supply of electric power to each of the processor and the second storage, if electric power has been supplied to the processor and the processor has been made to be in an operable first state, the processor creates second control information that is different from the first control information and stores the second control information in the second storage, and the power supply controller stops supply of electric power to each of the processor, the first storage, and the second storage; after the second control information created by the processor has been stored in the second storage.

4. The control device according to claim 3, wherein the power supply controller controls electric power to be supplied to the processor such that the processor is set to be in a second state in which power consumption is smaller than power consumption in the operable first state when an activation time indicating a time during which the processor is made to be in the operable first state exceeds a threshold, and the processor sets a value
obtained by adding
a reset time indicating a time during which the processor is made to be in the operable first state temporarily when the control device is shifted into the second mode from the first mode
to a first threshold indicating the threshold contained in the first control information
as a second threshold indicating the threshold contained in the second control information.

5. A computer program product comprising a non-transitory computer usable medium having computer readable program codes embodied in the medium that when executed causes a computer to execute a method for controlling a control device that includes
a processor that executes processing;
a first storage as a volatile storage;
a second storage as a non-volatile storage, and
a power supply controller that controls to supply and stop supply of electric power to each of the processor, the first storage, and the second storage, the method comprising:
starting, by the power supply controller, supply of electric power to each of the processor and the first storage
when the control device is shifted
into a second mode in which supply of electric power to each of the processor and the second storage is stopped and electric power is supplied to the first storage
from a first mode in which
first control information to be used for controlling a state of the processor is stored in the second storage and
supply of electric power to each of the processor, the first storage unit, and the second storage is stopped;

creating, by the processor, second control information that is different from the first control information so as to store the second control information in the first storage, if electric power has been supplied to the processor and the processor has been made to be in an operable first state; and stopping, by the power supply controller, supply of electric power to the processor after the second control information created by the processor has been stored in the first storage.

* * * * *